3,155,284
DUAL SWINGABLY MOUNTED POT
Sol Forman and Walter S. Motyka, Brooklyn, and Seymour Sloyer, Lawrence, N.Y., assignors to Forman Family, Inc., Brooklyn, N.Y., a corporation of New York
Filed Jan. 30, 1962, Ser. No. 169,874
13 Claims. (Cl. 222—144)

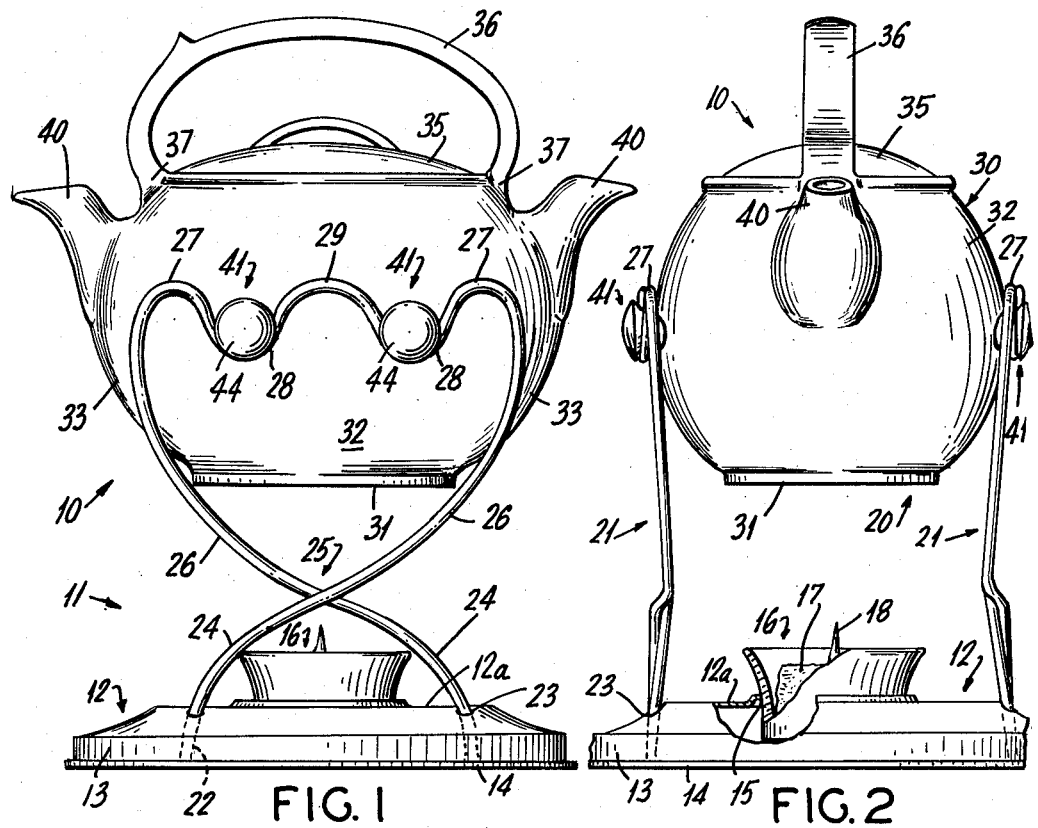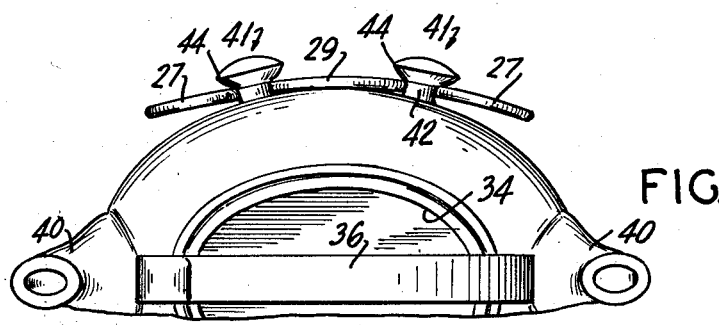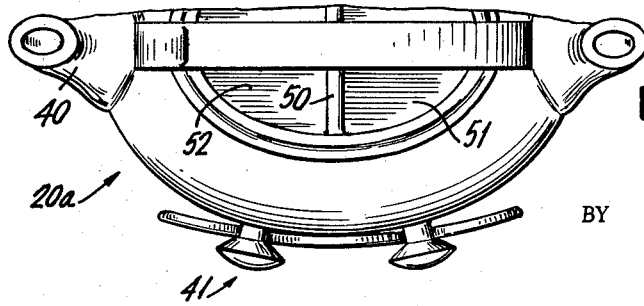

This invention relates to dual swingably mounted pots.

An object of this invention is to provide a device of the character described, in which a pot having a pair of oppositely extending spouts is mounted on a supporting stand in such a way that it may be tilted in one direction to pour from one spout, or tilted in an opposite direction to pour from the opposing spout, the pivotal supports for said pot serving to hold said pot in horizontal, non-pouring position on said stand.

A further object of this invention is to provide a device of the character described comprising a base, an upstanding support fixed to the base, and a pot mounted on said support for tilting movement in opposite directions about a pair of spaced, horizontal, transverse, co-level symmetrical axes, located between said spouts.

Still a further object of this invention is to provide a strong, rugged and durable supported device of the character described, which shall be relatively inexpensive to manufacture, easy to manipulate, attractive in appearance, and yet practical and efficient to high degree.

Other objects of this invention will in part be obvious and in part hereinafter pointed out.

The invention accordingly consists in the features of construction, combination of elements and arrangement of parts, which will be exemplified in the construction hereinafter described, and of which the scope of invention will be indicated in the following claims.

In the accompanying drawing, in which is shown an illustrative embodiment of this invention, FIG. 1 is a side elevational view of a dual swingably mounted pot embodying the invention;

FIG. 2 is a front elevational view thereof with parts broken away and in cross-section;

FIG. 3 is a partial, cross-sectional view of the structure shown in FIG. 1, with the pot cover removed; and FIG. 4 is a top plan view of a device embodying the invention with the cover removed, and illustrating a modified construction.

Referring now in detail to the drawing, 10 designates a pot and stand assembly embodying the invention. The same comprises a stand 11. Said stand 11 comprises a base 12 to which is fixed a pair of upwardly-extending, opposed supports 21. Said base 12 may be annular in shape, and comprises a top wall 12a from which extends downwardly, an outer skirted portion 13 formed at its lower end with a rolled-back bead 14. The top wall 12a is formed with a central opening 15 in which may be inserted a cup 16 containing a candle 17. The candle has a wick 18 which when lit, produces heat for the purpose hereinafter appearing. Instead of a candle, any other suitable heating means may be used for heating the pot 20, to be described hereinafter.

Fixed to the base 12 are a pair of similar, symmetrically disposed, opposed, upwardly-extending side supports 21. Each side support 21 may be made of wire stock. Each support 21 has lower foot portions 22 extending through openings 23 in the base and soldered or welded to the skirt portion 13 of the base. Extending upwardly from the foot portions 22 are upwardly and inwardly curved portions 24 which cross each other as at 25. Extending therefrom are upwardly and inwardly curved portions 26. Extending from the upper end of each portion 26 is an inwardly and downwardly curved portion 27. Extending from the portions 27 are downwardly and then upwardly curved, upwardly-opening, half bearing portions 28. The half bearing portions 28 are interconnected by an upwardly curved central portion 29. It will be noted that the portions 28 are symmetrical with respect to a vertical plane passing through the axis of the round base and at right angles to the supports 21. The portions 27 are also symmetrical to said plane, as are the portions 26 and portions 24, as well as the portions 22.

The pot 20 is supported on the stand 11 between supports 21. Said pot 20 may be used for tea, coffee, or other liquids, hot or cold. It comprises a pot body 30 having a bottom wall 31, side walls 32 and end walls 33. The pot is open at the top, at at 34, and may be provided with the usual cover 35. It may also be provided with a handle 36 which extends longitudinally and straddles the top opening 34, being connected to the pot at opposite ends of the opening, as at 37. Extending outwardly from opposite ends of the pot are oppositely extending, similar, symmetrically disposed spouts 40. It will be noted that the pot is bellied at the sides and also at the front, vertically as well as horizontally. The upper ends of the supports 21 may likewise be somewhat bellied or curved as shown in FIG. 3, to conform generally to the shape of the sides of the pot.

Fixed to opposite sides of the pot integrally therewith, are pairs of knobs 41 all at the same level. Each knob 41 has a neck 42 extending from the side of the pot, and from which extends an enlarged head 44. The knobs at one side are aligned with the knobs at the opposite side. The knobs are symmetrical with respect to the middle of the pot, and are located between the spouts. The pot may be supported on the stand with the necks 42 of the knobs 41 engaged within the half bearing portions 28 of the supports 21. Thus, the pot is horizontally supported above the heating means 16, which in this case is a candle. The pot may be tipped, pivoted or tilted in one direction about one pair of aligned neck-engaging half bearing portions 28, to pour from one spout, or tipped, pivoted or tilted in the opposite direction about the other pair of aligned, neck-engaging half bearing portions, to pour from the opposite spout. Also, the pot is supported in horizontal position firmly on the four knobs 41, the necks of which are received within the four half bearing portions 28.

In FIG. 4, there is shown a modified pot 20a similar to the pot 20, except that it is provided with a transverse wall 50 dividing the interior of the body of the pot into two chambers 51, 52, so that one liquid may be contained in one chamber and another liquid in the other chamber. Thus a person may serve coffee or hot water from one chamber, and tea from the other chamber. Of course, the cup is held beneath the spout when the pot is tilted to pour into the cup.

One advantage of the present construction is that the assembly or device 10 may be placed in the center of the table and liquid may be poured therefrom to persons sitting on opposite sides of the table, without turning the device around. To do this, persons on one side of the table are served by pouring from one spout 40, and persons on the other side of the table may be served by pouring from the opposite spout.

Also, it will be obvious that the pouring in either direction is done without taking the pot off the stand, so that while the pot is being tilted it is nevertheless being supported on one horizontal axis or the other, depending on in which direction the pouring is taking place. This feature greatly facilitates the pouring, since the person doing the pouring does not have to hold a heavy, hot pot in her hand while pouring.

It will be observed that the portions 28 of each support 21 constitute upwardly-opening, curved half bearings or notches receiving the lugs or knobs 41. Said knobs 41 may extend radially of the outer curved surfaces of the sides of the pot, or they may be in alignment. The necks 42 are round, and the portions 28 of the supports are round, so that the necks 42 may rotate within the notches when the pot is tilted. When the pot is tilted in one direction, one pair of opposed nobs remains engaged with a pair of opposed portions 28, while the other pair of knobs lifts out of the other pair of opposed portions 28. By having the portions 28 rounded and the necks 42 rounded, pivotal or tilting motion of the pot is facilitated in either direction. When the pot is tilted in either direction, the spouts will overlie the base, which can then catch drippings.

It will thus be seen that there is provided a dual swingably mounted pot in which the several objects of the present invention are achieved and which is well adapted to meet the conditions of practical use.

As possible embodiments might be made of the above invention, and as various changes might be made in the embodiment above set forth, it is to be understood that all matter herein set forth or shown in the accompanying drawing, is to be interpreted as illustrative and not in a limiting sense.

We claim:

1. In combination, a stand, a pot comprising a body provided with oppositely extending spouts, said stand having a pair of spaced upwardly fully opening half bearings, and means on the pot to support said pot concurrently and solely on both said half bearings of said stand in a position of rest, and for pivotal movement of said pot, selectively, on each of said pair of spaced upwardly fully opening half bearings, said half bearings having horizontal axes transverse to the pot, so that said pot is pivotally movable in one direction on one of said pair of bearings from a rest position to one pouring position and in an opposite direction on the other of said pair of bearings from a rest position to another and opposite pouring position, said pot being unattached to the stand and liftable straight upwardly off the stand from said position of rest on both said half bearings, and from pivoted position on either of said half bearings for removal from said stand.

2. The combination of claim 1, in which said axes are at the same level and disposed between said spouts.

3. The combination of claim 2, said axes being equally spaced from the middle of the pot.

4. In combination, a stand comprising a base and a pair of opposed supports on the base, said supports having aligned pairs of opposed upwardly fully opening half bearings and a pot between said supports and having at the sides thereof pairs of lugs concurrently engaged in said half bearings to solely support said pot in a position of rest and selectively pivotally engaging said half bearings, so that said pot is pivotally movable in one direction on one pair of half bearings from a rest position to one pouring position and in an opposite direction on another pair of half bearings from a rest position to another and opposite pouring position, said pot being unattached to the stand and liftable straight upwardly off the stand from said position of rest on both said half bearings, and from pivoted position on either of said half bearings for removal from said stand.

5. In combination, a stand comprising a base, a pair of opposed supports on said base, a pot supported on and between said supports, said pot comprising a body provided with oppositely-extending end spouts and with a pair of outwardly-extending lugs at each side of the body, and said supports having upwardly-opening half bearing means concurrently engaging and receiving said lugs and solely supporting said pot in a position of rest, and releasably selectively and rotatably engaging said lugs, so that said pot is pivotally movable in one direction of one half bearing means from a rest position to one pouring position and in an opposite direction on another half bearing means from a rest position to another and opposite pouring position, said pot being unattached to the stand and liftable straight upwardly off the stand from said position of rest on both said half bearings, and from pivoted position on either of said half bearings for removal from said stand.

6. The combination of claim 5, said lugs comprising necks received in said half bearings and heads at the outer ends of said necks.

7. The combination of claim 5, said lugs being all at the same level and disposed between said spouts and equally spaced from the middle of said pot.

8. In combination, a stand comprising a base, a pair of opposed upstanding side supports fixed to said base and extending upwardly therefrom, each support being made of wire stock and comprising a pair of feet fixed to the base, portions curved upwardly and inwardly extending from said feet and crossing each other, portions curved upwardly and outwardly and extending from said upwardly and inwardly curved portions, portions curved downwardly and inwardly from the upper ends of said upwardly and outwardly curved portions, half bearing portions curved downwardly and then inwardlly and upwardly extending from said downwardly and inwardly curved portions and interconnected by a central upwardly curved portion, and a pot between said supports having a pair of knobs extending from each side thereof, each knob comprising a neck from which extends a head and said necks being received in said half bearing portions, and said pot comprising a body having integral spouts at opposite ends thereof, so that said pot is pivotally movable in one direction on a pair of half bearing portions of said opposed supports from a rest position to one pouring position and in an opposite direction on another pair of half bearing portions of said opposed supports from a rest position to another and opposite pouring position.

9. The combination of claim 8, said body formed with an integral transverse wall dividing the body into a pair of chambers, one chamber communicating with one spout and the other chamber communicating with the other spout.

10. The combination of claim 1, said pot being provided with an integral transverse partition dividing the pot into two chambers, one communicating with one spout and one with the other spout.

11. The combination of claim 4, said pot having oppositely extending spouts, and said base being of such dimension that when the pot is tilted in either direction on said half bearings, the downwardly tilted spout will overlie said base.

12. The combination of claim 5, said supports being made of wire stock.

13. In combination a base, a pair of similar opposed vertical, aligned side supports on said base, each support comprising a single piece of wire stock having legs fixed to the support and being formed with upwardly fully opening, spaced half bearings and a pot between said supports and having a pair of outwardly extending lugs at each side, concurrently received and engaged in said half bearings to support said pot in a position of rest, and selectively and removably pivotally engaging said half bearings, and said pot having spouts at its opposite ends whereby said pot may be tilted from a rest position in one direction on one pair of aligned half bearings to pour from one spout, and tilted from a rest position in an opposite direction on the other aligned pair of half bearings to pour front the other spout, said pot being unattached to the stand and liftable straight upwardly off the stand from said position of rest on both said half bearings, and from pivoted position on either of said half bearings for removal from said stand.

References Cited in the file of this patent

UNITED STATES PATENTS

| | | |
|---|---|---|
| 638,641 | McAusland | Dec. 5, 1899 |
| 1,433,009 | Hildebrandt | Oct. 24, 1922 |
| 1,484,889 | Kaye | Feb. 26, 1924 |
| 1,878,348 | TeSelle | Sept. 20, 1932 |